Dec. 4, 1956  J. ANDREOLA  2,772,432
PLASTIC TUBE WITH SPREADER
Filed March 30, 1954
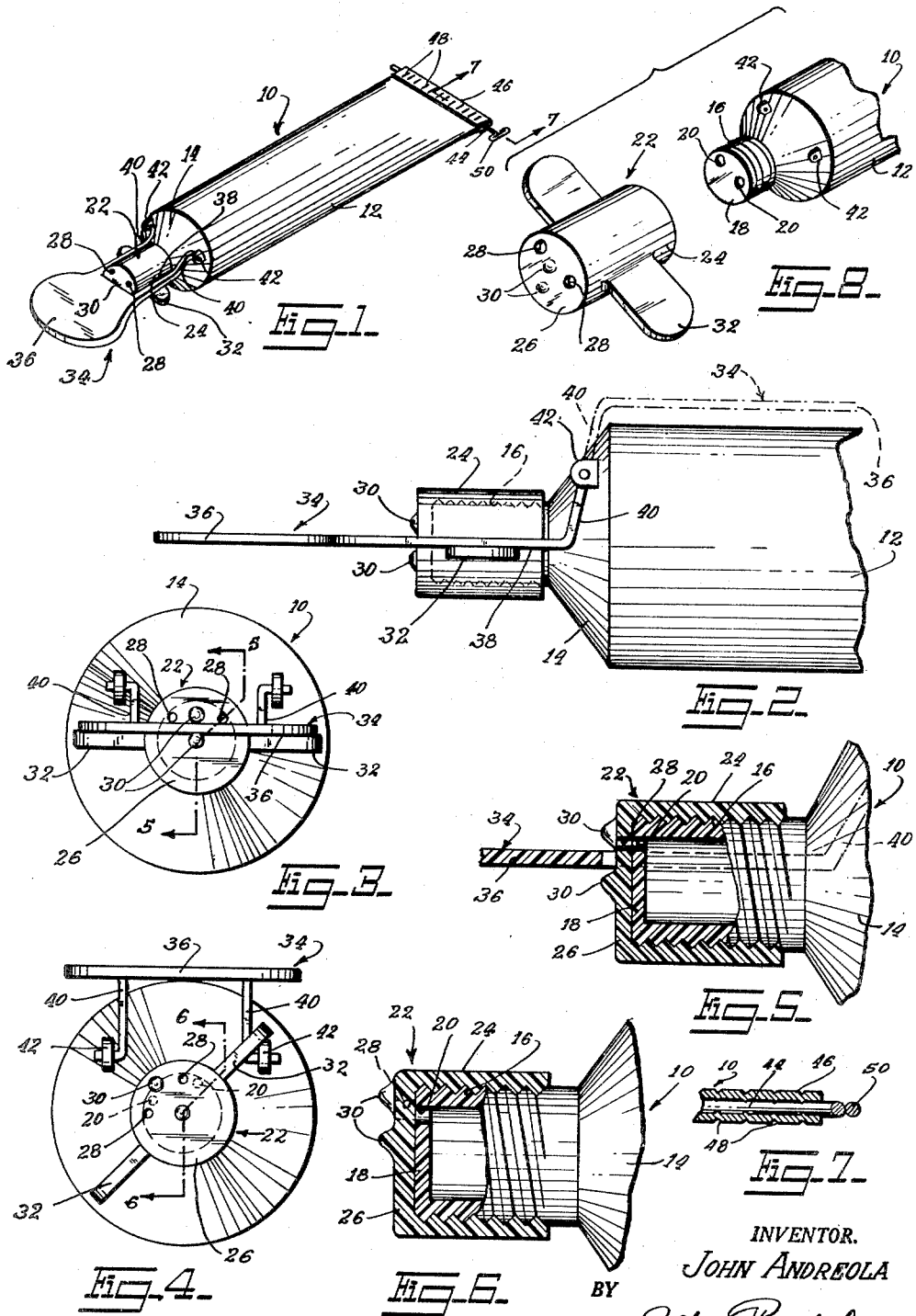
INVENTOR.
JOHN ANDREOLA
BY
Zoltan Holochek
ATTORNEY

United States Patent Office 2,772,432
Patented Dec. 4, 1956

2,772,432

PLASTIC TUBE WITH SPREADER

John Andreola, Bronx, N. Y.

Application March 30, 1954, Serial No. 419,760

4 Claims. (Cl. 15—138)

This invention relates to dispensing containers. More particularly, the invention has reference to a container of the character referred to, having mounted thereon a spatula-like attachment, to facilitate spreading of the contents.

Many spreadable foods, such as mayonnaise, sandwich spreads, catsup, and the like, are difficult to dispense and spread. Normally, such foods are merchandised in bottles or jars, and are dispensed by invention and shaking of the container, or by extraction of the contents with a spoon or knife.

Considerable inconvenience, annoyance, and inability to achieve uniform dispensing and spreading attends the removal of foods of the nature referred to from their containers. An important object of the present invention, accordingly, is to provide a generally improved dispensing container for foods, associated with a spatula means. It is proposed, in this regard, to so design the container as to facilitate measurably the dispensing of the container contents, and the uniform application of said contents to other foods such as breads, meats, etc.

A more specific object of the invention is to provide, in a container of the nature stated, a collapsible, tubular body having a general affinity to collapsible tubes such as those used in dispensing paste products, as for example shaving cream, toothpaste, and the like. It is proposed, in this regard, to form the container entirely of a plastic material with may desirably be of a transparent characteristic. It is further proposed that the product be attractively packaged in said container to facilitate use of the container at picnics and similar informal gatherings at which foods are consumed and at which knives and similar spreading utensils represent an inconvenience.

The further object of importance is to provide a container of the nature referred to which will be light in weight, and will be of space saving design, to facilitate packaging for shipment and storage in a relatively small area.

A further object is to provide a single use dispensing container of the type referred to which can be inexpensively designed and which might readily be formed to a size permitting distribution of the foods in individual portions.

A further object of importance is to provide, in a container as stated, a spatula means which will be swingable between operative and inoperative positions, with said spatula means being so designed as to automatically shift a novelly designed closure cap to an open position when the spatula means is swung to a location in which it will be operatively disposed for spreading.

Still another object is to provide, in association with the closure cap and spatula device, interlocking means which will cause a spatula and closure cap to be locked against relative movement when the closure cap is in closed position and the spatula means is operatively disposed for spreading of the dispensed contents.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a container and spreader device formed in accordance with the present invention.

Fig. 2 is an enlarged, fragmentary side elevational view of the container, the spreader being shown in full lines in operative position and in dotted lines in inoperative position.

Fig. 3 is an end elevational view taken from the left of Fig. 2.

Fig. 4 is a view similar to Fig. 3 in which the container is closed and the spreader is inoperatively positioned.

Fig. 5 is an enlarged sectional view taken substantially on line 5—5 of Fig. 3.

Fig. 6 is a view similar to Fig 5, taken substantially on line 6—6 of Fig. 4.

Fig. 7 is an enlarged sectional view on line 7—7 of Fig. 1.

Fig. 8 is an enlarged fragmentary perspective view similar to Fig. 1 showing the cap separated from the tube.

The reference numeral 10 has been applied generally in the several figures of the drawing to a container for jellies, catsup, mayonnaise, sandwich spreads, and similar foods. Container 10, as shown, can be of the collapsible tube type such as that in which shaving cream and toothpaste are ordinarily dispensed. Container 10, thus, includes a body 12 of readily deformable material such as thin flexible, clear plastic, adapted to be grasped in the hand and squeezed for the purpose of forcing a selected amount of the container contents therefrom.

At one end, the container body 12 is provided with a frustro-conical container end wall 14 preferably formed of a clear, rigidly constituted plastic. End wall 14, at its smaller end, is integral with an axially extending, externally, threaded neck 16 formed at its outer end with a neck end wall 18 having circumferentially spaced apertures 20. A pair of apertures 20 are shown in the illustrated example. However, the number of said apertures can be increased or decreased as desired.

A closure cap 22 is also of a clear plastic material in a preferred embodiment, and has a sleeve-like, cylindrical body 24 internally threaded for engagement with the threads of the neck 16. The body 24, at its outer end, is integral with a cap end wall 26, having circumferentially spaced openings 28 registerable with the apertures 20 whenever the container contents are to be dispensed. A pair of integral, rounded protuberances or locking lugs 30 are formed upon and are spaced radially of the cap end wall. In the illustrated example, one of the lugs 30 is disposed centrally of the end wall, the other lug 30 being spaced radially of the cap from the centrally located lug, and being disposed between and being equidistant from the openings 28, said openings being closely spaced from the second-named lug 30.

Also integrally formed upon the closure cap are relatively elongated wings 32 projecting outwardly from diametrically opposite portions of the body 24, intermediate opposite ends of said body 24. Wings 32 are coplanar, and as shown in Fig. 3, lie in a plane normal to a line drawn radially of the closure cap through the locking lugs 30.

A spreader device has been designated generally at 34, and includes a flat, plastic body 36 the outer end of which is widened and rounded to facilitate uniform application of the container contents. Body 36, at its inner end, is reduced in width to a transverse dimension a little greater than the outer diameter of the closure cap. At said inner end, the spreader device includes parallel, straight, relatively elongated arms 38 adapted to extend along opposite sides of the sleeve body 24 in the operative, full line position of the spreader shown in Fig. 2. At their inner ends, arms 38 merge into extensions 40 disposed obliquely to the plane of the spreader body 36. Extensions 40, at their free ends, have outwardly directed fingers rotatably bearing in apertured ears 42 rigid with and projecting forwardly from wall 14.

The spreader 34 is thus mounted for swinging movement about an axis extending transversely of the container and disposed normally to the axis of rotation of the closure cap 24. The spreader swings between the full and dotted line positions shown in Fig. 2. As will be noted, when in its inoperative, dotted line position the spreader is disposed in longitudinal contact with the container body, so as to represent a minimum projection laterally of the container. This facilitates packaging operations, and reduces the overall space required for the device during shipment or storage. The annular disposition of the extensions 40 relative to the main plane of the spreader facilitates this action, of course, it being observed that the ears 42 are disposed midway between the outer surface of the container body, and the longitudinal center line of said body. When the spreader is operatively disposed, the plane thereof is in closely spaced, parallel relation to the axis of rotation of the closure cap.

In use, and assuming that the spreader is to be inoperatively disposed, with the container closed, the parts will appear as shown in Fig. 4. In this position of the parts, the openings 28 are out of registration with the apertures 20, thus effectively closing the container. Wings 32 are tilted out of a plane parallel to the inoperatively disposed spreader body 36 and spreader arms 38.

If the container is to be used for dispensing and spreading, the spreader body is grasped, and swung counterclockwise from the dotted line position thereof shown in Fig. 2. This causes one of the arms 38 to engage the upwardly tilted wing 32 shown at the right in Fig. 4. Further swinging movement of the spreader in the direction of the closure cap causes said arm 38 to bear downwardly against the wing 32 engaged thereby, causing clockwise rotation of the closure cap to the operative, container-opening position of said cap shown in Fig. 3. Ultimately, the wings 32 will move into a plane parallel to the plane of the body 36, and the inner end edge of the body will, at the same time, snap over the outwardly disposed locking lug 30, that is, the upper one of said lugs in the several figures of the drawing. The spreader body is thus lockingly engaged between lugs 30, in the position shown in Figs. 3 and 5. In this way, the closure cap is locked in its open position, with its open ends 28 in registration with the apertures 20, and at the same time, the spreader body is operatively disposed for spreading of the container contents.

One need now only rotate the entire device about the longitudinal center line thereof, 90° from the position shown in Figs. 1 and 3. In other words, by rotating the entire device bodily through 90°, the dispensing openings will be now disposed below the plane of the spreader body. Squeezing pressure is now applied to the container body, and the container contents will be spread upon the desired food. The spatula-like spreader body may now be readily applied to uniformly distribute the dispensed food product.

When the container is no longer to be used, the spreader body is swung upwardly, said body snapping over the upper lug 30 to permit the spreader to be swung to its inoperative position. The user then rotates the closure cap slightly in a counterclockwise direction to the position shown in Fig. 4.

In Fig. 7, there is shown a wire reinforcing bar 44 engaged in the folded bottom end portion 46 of tube body 12. The bottom end portion after being folded over onto the bar 44 is crimped at spaced intervals as at 48 to prevent relative movement of the bar and end portion. The bar has both ends projecting laterally of the body, one end being formed with a handle 50 to facilitate rolling up of the body. The bar is particularly intended and adapted to hold the tube when the tube is rolled up.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A combined dispensing container and spreader device comprising a container body, means closing one end of the body and formed with a dispensing aperture, a closure cap movably mounted on said means and having a dispensing opening registrable with said aperture in one position to which the cap is moved, and a spreader device mounted on said means for adjustment between an inoperative position spaced from the cap and an operative position adjacent the dispensing opening of the cap, said means comprising a container end wall and a neck on said end wall having an end wall in which said aperture is formed, said spreader device being pivotally attached to the container end wall, the cap having means engageable by the spreader device on swinging of the spreader device to operative position, said last-named means comprising a wing projecting radially and outwardly from the cap in the path of swinging movement of the spreader device, the cap being rotated by the spreader device to a position in which said opening and aperture move into registration substantially simultaneously with movement of the spreader device to its operative position.

2. A combined dispensing container and spreader device comprising a container body, means closing one end of the body and formed with a dispensing aperture, a closure cap movably mounted on said means and having a dispensing opening registrable with said aperture in one position to which the cap is moved, and a spreader device mounted on said means for adjustment between an inoperative position spaced from the cap and an operative position adjacent the dispensing opening of the cap, said means comprising a container end wall and a neck on said end wall having an end wall in which said aperture is formed, said spreader device being pivotally attached to the container end wall, the cap having means engageable by the spreader device on swinging of the spreader device to operative position, said last-named means comprising a wing projecting radially and outwardly from the cap in the path of swinging movement of the spreader device, the cap being rotated by the spreader device to a position in which said opening and aperture move into registration substantially simultaneously with movement of the spreader device to its operative position, the cap including means lockably engaging the operatively disposed spreader device when said aperture and opening are in registration.

3. A combined dispensing container and spreader device comprising a container body, means closing one end of the body and formed with a dispensing aperture, a closure cap movably mounted on said means and having a dispensing opening registrable with said aperture in one position to which the cap is moved, and a spreader device mounted on said means for adjustment between an inoperative position spaced from the cap and an operative position adjacent the dispensing opening of the cap, said means comprising a container end wall and a neck on said end wall having an end wall in which said aperture is formed, said spreader device being pivotally attached to the container end wall, the cap having means engageable by the spreader device on swinging of the spreader device to operative position, said last-named means comprising a wing projecting radially and outwardly from the cap in the path of swinging movement of the spreader device, the cap being rotated by the spreader device to a position in which said opening and aperture move into registration substantially simultaneously with movement of the spreader device to its operative position, the cap including means lockably engaging the operatively disposed spreader device when said aperture and opening are in registration, said lock means comprising radially spaced lugs formed upon the cap between which lugs said spreader device is releasably engaged.

4. A combined dispensing container and spreader device comprising a container body, means closing one end of the body and formed with a dispensing aperture, a closure cap movably mounted on said means and having a dispensing opening registrable with said aperture in one position to which the cap is moved, and a spreader device mounted on said means for adjustment between an inoperative position spaced from the cap and an operative position adjacent the dispensing opening of the cap, said means comprising a container end wall and a neck on said end wall having an end wall in which said aperture is formed, said spreader device being pivotally attached to the container end wall, the cap having means engageable by the spreader device on swinging of the spreader device to operative position, said last-named means comprising a wing projecting radially and outwardly from the cap in the path of swinging movement of the spreader device, the cap being rotated by the spreader device to a position in which said opening and aperture move into registration substantially simultaneously with movement of the spreader device to its operative position, the cap including means lockably engaging the operatively disposed spreader device when said aperture and opening are in registration, said lock means comprising radially spaced lugs formed upon the cap between which lugs said spreader device is releasably engaged, the spreader device including a flat body shaped as a spatula and yoke arms extending from one end of the spreader body to the pivotal connection of the spreader device to the container, said arms embracing the closure cap between them in the opposite position of the spreader body with said end of the spreader body being engaged between the lugs.

References Cited in the file of this patent

UNITED STATES PATENTS

| | | |
|---|---|---|
| 1,754,547 | Duerner | Apr. 15, 1930 |
| 1,776,387 | Holzmark | Sept. 23, 1930 |
| 1,779,216 | Rader | Oct. 21, 1930 |
| 1,894,152 | Bolz | Jan. 10, 1933 |
| 2,622,258 | Giraud | Dec. 23, 1952 |
| 2,663,040 | Leckler | Dec. 22, 1953 |
| 2,669,740 | Main | Feb. 23, 1954 |